United States Patent [19]
Gattolliat et al.

[11] Patent Number: 5,083,590
[45] Date of Patent: Jan. 28, 1992

[54] THREE-WAY VALVE

[75] Inventors: Andre Gattolliat, Grand-Lancy; Jean-Pierre Ramillon, Perly, both of Switzerland

[73] Assignees: Sulzer Brothers Ltd., Winterthur; Honeywell-Lucifer, Geneva, both of Switzerland

[21] Appl. No.: 557,559

[22] Filed: Jul. 24, 1990

[51] Int. Cl.⁵ .............................................. F16K 11/14
[52] U.S. Cl. .................. 137/870; 137/596.17; 137/607; 137/627
[58] Field of Search .............. 137/596.17, 607, 627, 137/870

[56] References Cited
U.S. PATENT DOCUMENTS 3,043,336 7/1962 Parent et al. ............... 137/596.17 X
3,934,610 1/1976 Solie ........................... 137/596.16 X Primary Examiner—Gerald A. Michalsky
Attorney, Agent, or Firm—Kenyon & Kenyon

[57] ABSTRACT

The three-way valve has a chamber in the body which is adapted to provide a connection from an outlet passage to both inlet passages. One inlet passage is closed by a valve lid which bears on a valve seat and which functions as an automatic outlet valve when the armatures moves into a top position. The other valve lid moves independently in dependance on the inlet pressure of the second inlet passage and the pressure in the outlet passage. In the illustrated rest position, the armature acts by way of a convex closure member to press the lower valve lid onto a valve seat about the second inlet passage.

19 Claims, 2 Drawing Sheets

THREE-WAY VALVE

This invention relates to a three-way valve. More particularly, this invention relates to a three-way seated valve.

Heretofore, various types of three-valves have been known for controlling the flow of a medium through three passages. Generally, such valves are constructed with a body having three passages extending to a common chamber with communication from two passages to the chamber being controlled by two valve lids, each of which cooperates with a valve seat. In such constructions, various means have been provided for controlling the movement of the lids. Generally, each lid is moved in a positive manner by an actuating element in order to control a flow through a respective passage.

It is an object of this invention to provide a three-way valve of simple construction.

It is another object of the invention to provide a three-way valve which can be used to replace two two-way valves and an automatic check valve.

Briefly, the invention is directed to a three-way valve comprising a body having a chamber, three flow passages extending outwardly from the chamber and valve seats between the chamber and each of two of the passages. In addition, the valve includes a pair of valve lids in the body for seating on a respective valve seat in order to control a flow through a respective passage. A means is also provided for controlling the movement of the valve lids.

In accordance with the invention, the means for controlling the movement of the valve lids includes an actuating element for moving one of the lids from an open position to a closed position relative to a respective valve seat while the other lid is movable independently under the pressures in the chamber and the flow passages with the actuated valve lid in the closed position thereof. The second lid is also movable automatically into a closed position relative to a respective valve seat when the actuated lid is in the opened position thereof.

In accordance with the invention, the valve has only one lid which is actuated by an actuating element. The other lid moves freely under the influences of the pressures when the first lid is in the closed position and, in the absence of actuation element, a connection is provided with backlash between the two lids in order to automatically move the second lid into the closed position when the first lid is in the open position.

These and other objects and advantages of the invention will become more apparent from the following detailed description taken in conjunction with the accompanying drawings wherein.

Figure 1:
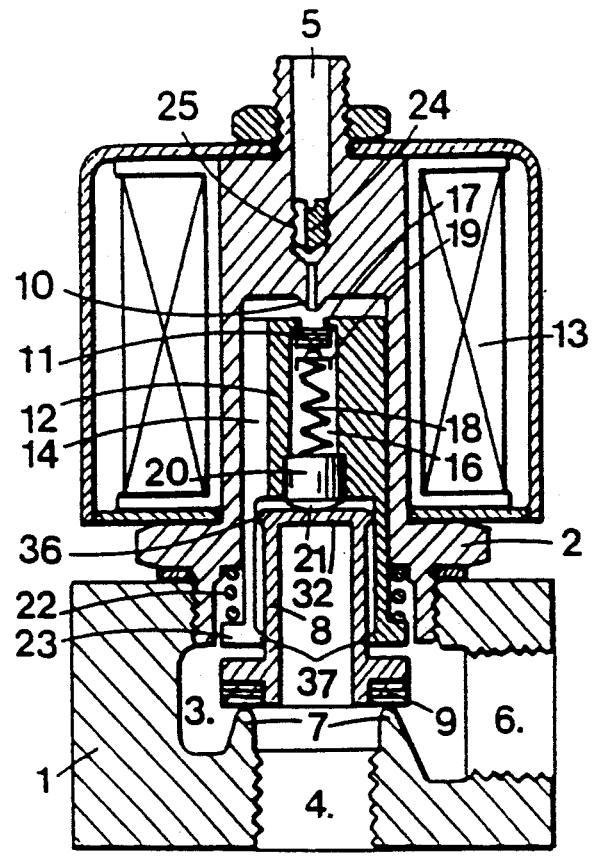
FIG. 1 illustrates a cross sectional view of a valve constructed in accordance with the invention.

Referring to FIG. 1, the three-way valve includes a body formed of two parts 1, 2 which are secured together as by a threaded connection and which cooperate to bound a chamber 3.

The bottom part 1, as viewed, includes a first inlet passage 4 which communicates with the chamber 3 and which has an internal thread for threaded connection to a gas feed line (not shown), for example for a low pressure gas, such as natural gas at a pressure of less than 200 mbar. The top part 2 has a second inlet passage 5 which extends to the chamber 3 as well as an external thread for connection of the passage 5 to a source of relatively high pressure. The bottom part 1 also has an outlet passage 6 leading from the chamber 3 which is formed with an internal screw thread for connection, for example, to a buffer tank (not shown).

The body part 1 also has a valve seat 7 at the end of the passage 4 to provide a seating surface for a valve lid 8. As indicated, the valve lid 8 carries a ring seal 9 for seating on the valve seat 7. In like manner, the upper passage 5 terminates at a valve seat 10 for seating of a second valve lid 11 thereon. As illustrated, the valve seat 10 has a free cross-section or diameter which is of smaller cross section or diameter than the free cross section of the valve seat 7.

A means is also provided for controlling the movement of the two valve lids 7, 11. This means includes an actuating element such as a magnetizable armature 12 in which the valve lid 11 is mounted. As illustrated, a coil 13 is provided about the upper body part 2 within a suitable housing and circumferentially about the armature 12 in order to actuate the armature 12 for movement from a rest position, as shown in FIG. 1, with the valve lid 11 in an open position relative to the valve seat 10 to an actuated position in order to move the valve lid 11 into a closed position on the valve seat 10. In this respect, the armature 12 slides in a cylindrical bore in the top part 2 and is formed with a longitudinal groove 14 to provide a connection between the top part of this bore and the remainder of the chamber 3.

The armature 12 includes a cylindrical cavity 16 disposed on the longitudinal axis of the armature which terminates at the top in an inner shoulder 17 which retains the valve lid 11 within the armature 12. The cavity 16 communicates with an enlarged bore at the lower end of the armature 12 which telescopically receives the valve lid 8. In this respect, the lower end of the bore terminates in a bead 37 which cooperates with a bead-like member 36 on the top outer edge of an axial guide section of the valve lid so as to prevent the lid 8 from dropping out of the armature 12 during assembly. In addition, the annular bead-like member 36 serves to guide the valve lid 8 within the armature 12.

A retaining means is also disposed within the armature 12. This retaining means includes a spring 18 a cap 19 which is biased by the spring 18 against the valve lid 11 and a closure member 20 which is biased by the spring 18 against the valve lid 8. The spring 18 thus serves to bias the valve lids 8, 11 away from each other outwardly of the armature 12. As indicated, the closure member 20 serves to close the cavity 16 at the lower end. The closure member 20 also has a convex surface 21 on the bottom which cooperates with a transmission surface 32 on the lid 8. The closure member 20 is of cylindrical shape and moves in an appropriate cavity in the armature 12.

A spring 22 is disposed between the body part 2 and an annular collar 23 on the armature 12 so as to bias the armature 12 downwardly, as viewed to the rest position.

The connection between the valve lids 8, 11 is such as to result in a connection with backlash between the lids 8, 11 and allows the lid 8 to close on the valve seat 7 when the lid 11 closes on the valve seat 10.

As illustrated, the annular collar 23 of the armature 12 is disposed coaxially opposite an annular flange of the valve lid 8 for purposes as described below.

A threaded screw 24 is also threaded into the passage 5 in the top part 2 and is provided with a bore 25 in order to throttle the flow of medium therethrough.

The function of the described valve is to convey a gaseous medium through the passage 4, 6 in to a buffer tank from which the medium is extracted and compressed to a much higher pressure of the order of magnitude of 200 bar for further processing, such as the charging of high-pressure accumulators. High pressure gas is supplied to the passage 5, for instance in a small side connection from the compressor delivery line, whereas the major stream is fed through a check valve into the accumulator.

When the compressor (not shown) starts, the valve is energized so that the coil 13 is supplied with the electrical energy and the armature 12 moves from the rest position shown in FIG. 1 to an actuated position so that the valve lid 11 seats on the valve seat 10 to prevent flow into the chamber 3 from the passage 5. Once the extracting compressor causes the pressure in the passage 6 to drop below the pressure in the passage 4, the valve lid 8 disengages from the valve seat 7 and allows the gas to pass from the passage 4 through the chamber 3 into the passage 6 and, thus, to the buffer tank (not shown).

Advantageously, so stop the compressor, the pressure in the compressor outlet line which is connected to the passage 5 and to the accumulator feeding line by a check valve is first reduced. Energization of the coil 13 ceases and the spring 22 forces the armature 12 downwardly to the rest position shown in FIG. 1.

When the valve lid 11 opens the valve seat 10, the high pressure from the passage 5 enters the chamber 3 so that the pressure in the chamber 3 rises. This pressure also acts by way of the valve lid 11, spring 18 and closure member 20 to close the lid 8 on the valve seat 7 in the manner of a check valve.

Gas feeding is now interrupted and the higher pressure gas passes through the valve seat 10, and groove 14 into the chamber 3 and onwards into the buffer tank. During this time, the gas flow is retarded by the resistance of the screw 24.

The buffer tank has a much larger volume than the high pressure feed line so that the equalizing pressure becomes much lower, for example, of the order or magnitude of 3 bar. When the compressor restarts, the seat 10 is closed by way of the armature 12 and the equalizing pressure in the passage 6 decreases until the pressure in the passage 4 is higher than in the passage 6 and sufficient to overcome the force of the spring 18 in the armature so as to lift the lid 8. This ensures that there is substantially no flowback into the supply network through the passage 4.

Figure 3:
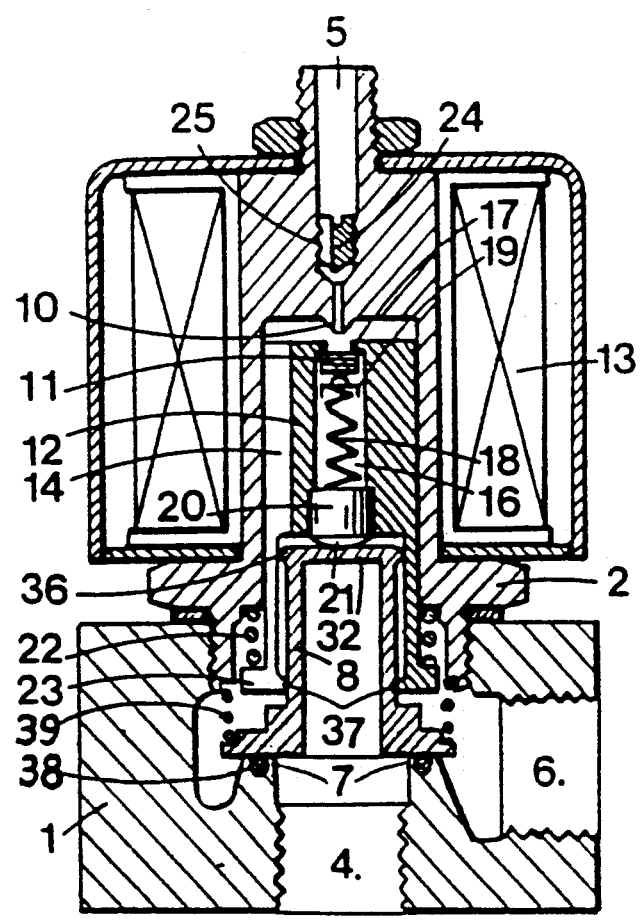
FIG. 3 illustrates a cross sectional view of a further modified valve constructed in accordance with the invention.

Referring to FIG. 3, wherein like references characters indicate like parts as above, the sliding friction between a disengaging armature 12 and the valve lid 8 may be taken into account by positioning a projecting O-ring 38 in the valve seat 7. Such a ring 38 may be made of a soft elastomer. In addition, a spring 39 is provided between the body part 2 and the valve lid 8 in order to bias the valve lid 8 against the O-ring 38. This feature of building up a metered barrier gas buffer is of interest for handling all gases which must not contact the atmosphere. Also, this feature is useful with the gas is merely air.

Figure 2:
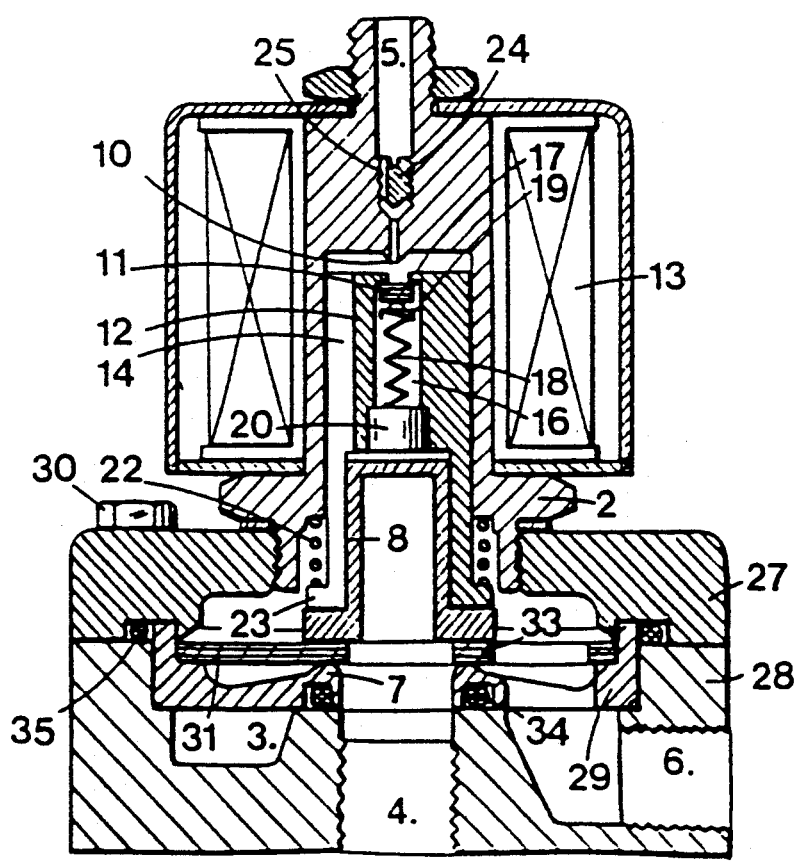
FIG. 2 illustrates a cross sectional view of a modified valve constructed in accordance with the invention.

Referring to FIG. 2, wherein like references characters indicate like parts as above, the body may be made of three parts 27, 28, 29 which are held together by screws 30. As shown, two parts 27, 29 cooperate to bound an annular recess in which a diaphragm 31 is mounted at the peripheral outer edge. As illustrated, the diaphragm 31 forms an inner ring 33 which can be readily moved axially between and which provides seal-tightness between the lid 8 and the valve seat 7. In this case, the valve seat 7 is supported in the housing part 29.

In this embodiment, the valve lid 8 slides in a guideway of the armature 12 and is biased by the spring 22 towards the valve sat 7. Suitable O-rings 34, 35 are disposed between the body parts 27, 28, 29 in order to provide a static seal between the parts.

As shown, the valve seat 7 is supported in the body part 29.

The advantage of this construction is that the top part of the valve comprising the parts 27, 29 can be preassembled. The delicate parts of the valve, more particularly, the seat 7 and the diaphragm 31 are therefore protected and run no risk of being damaged before final assembly on the bottom part 28. The preassembled unit comprises two parts 27, 29 which can be replaced by a single part formed with a slot to receive the diaphragm edge and having a relatively substantial screw threaded fastening to the top part for assembly of the diaphragm.

The invention thus provides a three-way valve of relatively simple construction which can be used to replace two two-way valves and an automatic check valve.

What is claimed is:

1. A three-way valve comprising
a body having a chamber therein, three flow passages extending outwardly from said chamber, a first valve seat between said chamber and one of said passages and a second valve seat between said chamber and a second of said passages;
a first valve lid in said body for seating on said first valve seat to control a flow through said one passage;
a second valve lid in said body for seating on said second valve seat to control a flow through said second passage; and
means for controlling the movement of said valve lids, said means including a single actuating element for moving one of said lids from an open position to a closed position relative to a respective seat with the other lid being movable independently of said actuating element under the pressures prevailing in said chamber and said flow passages with said one lid in said closed position and being movable automatically into a closed position relative to a respective valve seat with said one lid in said open position, said actuating element being a magnetizable armature slidably mounted in said body along a displacement axis, said one lid being supported by said armature coaxially of said axis and said other lid having an axial guide section on said axis.

2. A three-way valve as set forth in claim 1 wherein said means includes a spring between and body and said other lid for biasing said other lid onto said respective valve seat.

3. A three-way valve as set forth in claim 1 wherein said other lid has a slideway opposite said armature for axial guidance of said other lid.

4. A three-way valve as set forth in claim 1 wherein said other lid has a slideway opposite a guideway of said body.

5. A three-way valve as set forth in claim 1 wherein said guide section of said other lid is slidably mounted in said armature.

6. A three-way valve as set forth in claim 5 wherein said other lid has an annular flange and said armature has an annular collar for abutting said flange to effect movement of said other lid into a closed position thereof.

7. A three-way valve as set forth in claim 1 wherein said valve seat for said one lid is of a smaller diameter than said other valve seat whereby said one lid controls a gaseous medium at a higher pressure than a medium controlled by said other lid.

8. A three-way valve as set forth in claim 7 which further comprises means in said passage controlled by said other lid for retarding a flow therethrough.

9. A three-way valve as set forth in claim 1 which further comprises an elastomeric diaphragm between said other lid and said respective valve seat, said diaphragm being connected to said body to provide an axially displaceable annular surface between said other lid and said respective valve seat.

10. A three-way valve as set forth in claim 9 wherein said body is formed of three parts; a first of said parts having two of said passages therein, a second of said parts having one of said valve seats thereon and bounding an annular recess with a third of said parts, said diaphragm being secured between said second and third parts in said recess.

11. A three-way valve as set forth in claim 1 which further comprises an elastomeric ring in said valve seat for said other lid for seating of said other lid thereon.

12. A three-way valve as set forth in claim 1 which further comprises retaining means with backlash between said armature and said other lid.

13. A three-way valve comprising
a body having a chamber therein, three flow passages extending outwardly from said chamber, a first valve seat between said chamber and one of said passages and a second valve seat between said chamber and a second of said passages;
a first valve lid in said body for seating on said first valve seat to control a flow through said one passage;
a second valve lid in said body for seating on said second valve seat to control a flow through said second passage; and
means for controlling the movement of said valve lids, said means including a magnetizable armature for moving said first lid from an open position to a closed position relative to said first valve seat with said second lid being movable independently under the pressures in said chamber and said passages with said first lid in said closed position and being automatically movable into a closed position relative to said second valve seat with said first lid in said open position.

14. A three-way valve as set forth in claim 13 which further comprises a coil for actuating said armature for movement from a rest position with said first lid in an open position relative to said first valve seat to an actuated position to move said first lid into a closed position on said first valve seat.

15. A three-way valve as set forth in claim 14 wherein said first lid is mounted coaxially in said armature and said second lid is mounted coaxially of said armature.

16. A three-way valve as set forth in claim 15 wherein said second lid is slidably mounted in said armature.

17. A three-way valve as set forth in claim 16 which further comprises a spring in said armature between said lids for biasing said lids away from each other and outwardly of said armature.

18. A three-way valve as set forth in claim 14 which further comprises a spring between said armature and said body for biasing said armature into said rest position thereof.

19. A three-way valve as set forth in claim 13 which further comprises a spring between said lids for biasing said second lid into said closed position thereof.

* * * * *

UNITED STATES PATENT AND TRADEMARK OFFICE
CERTIFICATE OF CORRECTION

PATENT NO. : 5,083,590
DATED : January 28, 1992
INVENTOR(S) : Gattolliat et al.

It is certified that error appears in the above-identified patent and that said Letters Patent is hereby corrected as shown below:

Column 1, line 7, change "three-valves" to --three-way valves--

1, line 47, change "of actuation element" to --of an actuation element--

1, lines 55, 57 and 60, change "cross sectional" to --cross-sectional--

Column 2, line 17, change "cross-section" to --cross section--

2, line 49, change "18 a cap" to --18, a cap--

Column 3, line 29, change "so stop" to --to stop--

3, line 67, change "with the gas" to --when the gas--

Signed and Sealed this

Twenty-first Day of September, 1993

Attest:

BRUCE LEHMAN

*Attesting Officer*     *Commissioner of Patents and Trademarks*